United States Patent

Nakashima et al.

[15] 3,652,788

[45] Mar. 28, 1972

[54] FIELD SKIP MODE VIDEO TAPE RECORDER

[72] Inventors: Takashi Nakashima; Kazuaki Kakinuma, both of Katsuta-shi, Japan

[73] Assignee: Hitachi, Ltd., Tokyo, Japan

[22] Filed: June 10, 1969

[21] Appl. No.: 831,853

[30] Foreign Application Priority Data

June 17, 1968 Japan..................................43/41361

[52] U.S. Cl.........................................178/6.6 SF, 178/6.6 A

[51] Int. Cl.......................H04h 5/78, H04n 7/12, G11b 5/48

[58] Field of Search............................178/6.6 A, 6.6, 6.6 SF; 179/100.2 T

[56] References Cited

UNITED STATES PATENTS 3,251,934 5/1966 Van Den Bussch et al. ....179/100.2 T 3,391,248 7/1968 Hirota....................................178/6.6

3,445,608 5/1969 Kinjo et al..........................178/6.6 X 3,470,315 9/1969 Kihara...................................178/6.6

*Primary Examiner*—Bernard Konick

*Assistant Examiner*—Steven B. Pokotilow

*Attorney*—Craig, Stewart and Hill

[57] ABSTRACT

A field skip mode video tape recorder wherein a magnetic tape is transported while being slantly wound about half the periphery of two rotary magnetic heads which are connected to two sections of a halved slip ring and a brush is adapted to be alternately contacted with said two sections of the slip ring so that during the recording operation, only even fields of a video signal to be recorded may be supplied to one of the two heads, namely a recording head in synchronism with the period during which the recording head is connected with the brush and the tape, and during the reproducing operation, output signals from the heads which alternately appear at the brush are supplied to a single playback amplifier.

17 Claims, 5 Drawing Figures

INVENTORS

TAKASHI NAKASHIMA and KAZUAKI KAKINUMA

BY Craig, Antonelli, Stewart & Hill

ATTORNEYS

INVENTORS

TAKASHI NAKASHIMA and KAZUAKI KAKINUMA

BY Craig, Antonelli, Stewart & Hill

ATTORNEYS

FIELD SKIP MODE VIDEO TAPE RECORDER

BACKGROUND OF THE INVENTION

1. Field of the Invention

This invention relates to a video tape recorder (hereinafter referred as VTR) of helical scan type, and more particularly it pertains to a VTR provided with two rotary heads, wherein a video signal is recorded in a field skip mode and reproduced by scanning each recorded track twice by the two heads. In other words, each head scans on the same recorded track, respectively.

2. Description of the Prior Art

There have conventionally been proposed helical scan type field skip mode VTS's. An example of such a conventional VTR's is disclosed in U.S. Pat. No. 3,391,248.

In such conventional VTR, two heads, namely a recording-reproducing head and a reproducing head, are mounted on a rotary head holder at different levels with an angular difference of about 180° therebetween to form a rotary head device, and a magnetic tape is transported while being helically wound about half the periphery of the rotary head device.

During the recording operation, a video signal to be recorded is successively supplied only to one of the two magnetic heads, and during the reproducing operation, the difference in mount levels of the magnetic heads is adjusted to enable each of the heads to scan each magnetic track once, and output signals available from the two heads are alternately mixed or switched in order to obtain a reproduced video signal.

Description will first be made of the conventional video tape recorder shown in FIG. 1. In FIG. 1, numeral 1 presents a rotary head supporting disc on which at least three slip rings 3, 4 and 5 which are formed of a noble metal are provided coaxially with respect to a rotating shaft 2. The slip rings 3 and 4 are connected with the terminals 10 and 11 of coils 8 and 9 of a recording-reproducing head 6 and a reproducing head 7 respectively, and the remaining slip ring 5 is coupled to the other terminals 12 and 13 of the coils 8 and 9.

Numerals 14, 15 and 16 represent brushes which are adapted for sliding engagement with the slip rings 3, 4 and 5 respectively. The brush 16 is grounded, and the brushes 14 and 15 are connected with movable contacts 19 and 20 of a "recording" and "reproducing" selector switches 17 and 18 which are adapted for interlocking with each other.

A video signal $S_{in}$ to be recorded is supplied to a "recording" fixed contact 21 of the switch 17 through a recording amplifier 23. A "recording" fixed contact 22 of the switch 18 is grounded. Thus, when the switches 17 and 18 have their "recording" contacts engaged, the video signal is successively supplied only to the coil 8 of the head 6. In this case, however, the video signal is intermittently recorded on a tape 30 because the head 6 is brought into contact with the tape only for half the cyclic period of rotation thereof.

"Reproducing" fixed contacts 24 and 25 of the switches 17 and 18 are connected with reproducing amplifiers 26 and 27 respectively. When these switches have their "reproducing" contacts engaged, the outputs of the two heads are supplied to the amplifiers 26 and 27. The outputs of these amplifiers are passed to a mixer or switching circuit 28 to be alternately mixed or switched, and then to a demodulator 29 so as to be taken therefrom as a demodulation output $S_{out}$.

As described above, the conventional VTR is designed so that a video signal is successively supplied to only one head 6 during the recording operation. By such design, the recording circuit arrangement can be simplified. Disadvantageously, however, it is essential to provide at least three sets of slip rings and brushes, and furthermore, two reproducing amplifiers and one mixer or switching circuit are required in order to perform the reproducing operation.

Such slip rings and brushes are consumable parts, and the provision of these elements considerably increases manufacturing costs.

Furthermore, difficulty is experienced in the adjustment of the characteristics of the two reproducing amplifiers since it is required that these amplifiers be equipped with identical characteristics. In addition, since these amplifiers are operated in parallel with each other, there is the possibility that the operation tends to be unstabilized due to interference therebetween. Other drawbacks are such that a circuit for mixing or switching the outputs of the reproducing amplifiers is additionally required, and that noise tends to be increased when the outputs are mixed or switched.

SUMMARY OF THE INVENTION

It is an object of the present invention to provide field skip mode VTR which is free from the drawbacks of the aforementioned conventional VTR's and in which the operation is stably performed and noise is minimized during the reproducing operation.

Another object of the present invention is to provide a field skip mode VTR requiring a single reproducing amplifier and which is simplified in construction and capable of satisfactorily performing still reproduction.

In order to achieve the foregoing objects, in accordance with the present invention, contact means is provided in combination with a conventional rotary head device to establish an external connection with respect to two rotary magnetic heads by alternately switching these heads at every half cyclic period of rotation of the rotary head device, and the switching of the head connection is effected at a time slightly preceding the vertical synchronizing signals contained in a video signal to be recorded in order to locate phase disturbances of the horizontal synchronizing signal occurring when the heads are switched within the vertical fly-back period, the preceding period being set to about 0.6 to 2.3 percent of one cyclic period of rotation of the rotary head device, so that picture curvature is positioned beyond the field of vision. Further, during the recording operation, the video signal to be recorded is supplied to the aforementioned contact means at a time preceding by 0 to 2 percent of one cyclic period of rotation of the rotary head device to the time when the recording-reproducing head is connected with the contact means, and the end of the signal supply is set within a period from the time when the remaining head other than the recording-reproducing head is connected with the contact means and to a subsequent point of time when a vertical synchronizing signal occurs, so that a complete one-field video signal is supplied to the recording head.

With the foregoing arrangement, the signal supplying period described above is made to correspond to 50 to 54.3 percent of one cyclic period of the rotary head device.

Figure 1:
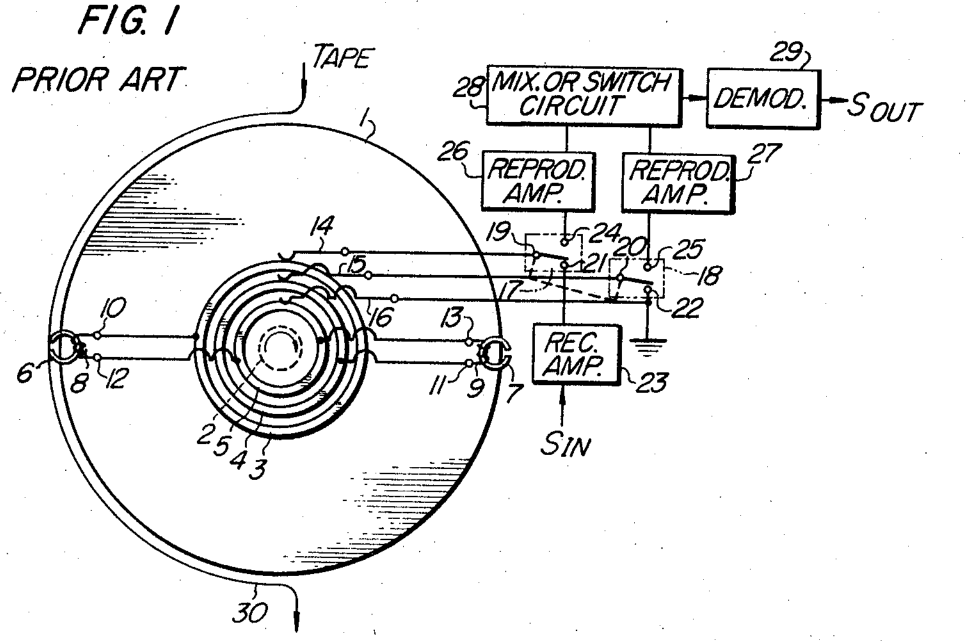
FIG. 1 PRIOR ART
FIG. 1 is a view showing the arrangement of a conventional video tape recorder.
Figure 2:
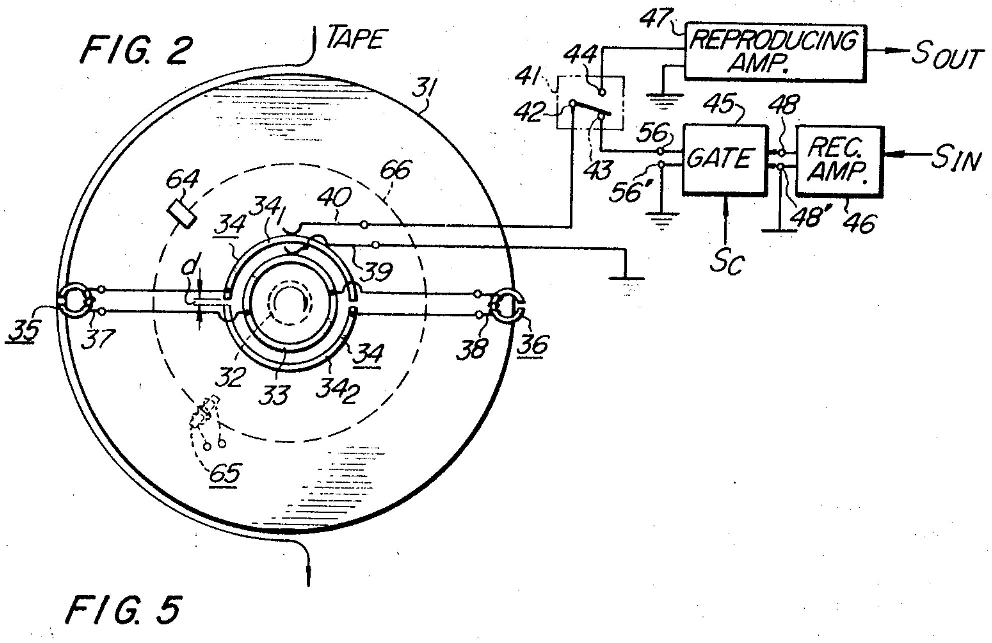
FIG. 2 is a view showing the arrangement of the video tape recorder according to an embodiment of the present invention.

DESCRIPTION OF THE PREFERRED EMBODIMENTS:

The present invention will now be described with respect to an embodiment shown in FIG. 2, wherein numeral 31 represents a head supporting disc which is rotated by a rotary shaft 32. On this disc 31, there are provided conductive slip rings 33 and 34 in coaxial relationship with each other. Also mounted on the disc 31 are a recording-reproducing head 35 and a reproducing head 36 at different levels. The ring 34 is divided into two sections, i.e., first and second arcuate segments $34_1$ and $34_2$, with small isolation gaps d between the opposing ends of the two arcuate segments.

A coil 37 of the recording-reproducing head 35 has one end terminal thereof connected to the first arcuate segment $34_1$ of the ring 34 and the other end terminal thereof coupled to the ring 33. A coil 38 of the reproducing head 36 has one end terminal thereof connected with the second arcuate segment $34_2$ of the ring 34 and the other end terminal thereof coupled to the ring 33.

Numeral 39 denotes a grounded brush which is fixedly provided on the VTR body (not shown) in such a manner that it is disposed in sliding contact with the ring 33.

Numeral 40 indicates a brush which is mounted on and insulated from the VTR body in such a manner that it is disposed in sliding contact with the ring 34. The gaps *d* of the ring 34 should be made as small as possible. There will arise no critical problem even if the first and second arcuate segments $34_1$ and $34_2$ are temporarily short-circuited by the brush 40.

The brush 40 is connected with a movable contact 42 of a "recording" and "reproducing" operation selector switch 41, and a "recording" fixed contact 43 of the switch 41 is coupled to a recording amplifier 46 through a gate circuit 45. A video signal $S_{in}$ to be recorded is supplied to the amplifier 46. A "reproducing" fixed contact 44 of the switch 41 is connected with a reproducing amplifier 47.

Description will be made of the operation of this embodiment.

The rotation of the support disc 31 of the rotary head device is normally controlled by a servo system in such a manner as to be rotated once per frame in synchronism with the vertical synchronizing signal of the video signal to be recorded.

The slip ring 34 is divided into two sections, and the coils 37 and 38 of the respective heads are coupled to the first and second arcuate segments $34_1$ and $34_2$ of the ring 34 respectively, as described above. Referring to FIG. 3*a*, $35_{on}$ and $36_{on}$ represent the states that the brush 40 is alternately connected with the heads 35 and 36 through the ring 34, respectively, and the waveform is shown neglecting the period for which the brush 40 slides over the isolation gaps *d* between the first and second arcuate segments $34_1$ and $34_2$. The heads 35 and 36 are alternately connected with the brush for an equal period of time.

In this example, one frame of the video signal to be recorded is composed of 525 horizontal scanning lines. In order to minimize adverse effects on a reproduced picture by the signal interruption which is caused when the brush 40 is switchingly connected with the heads 35 and 36 and transient noise resulting from the switching connection of the brush to the heads, the point of time when the heads are switched is made slightly precedent by a period of time $\tau_1$ with respect to the vertical synchronizing signal train shown in FIG. 3*b*, and the preceding period $\tau_1$ is selected to be 3 to 12H (H: horizontal scanning period).

Furthermore, the starting point $T_1$ of the conducting period $T_{on}$ of the gate circuit 45 is made precedent by $\tau_2$ with respect to the point of time $T_2$ when the recording-reproducing head 35 is connected with the brush 40, and the preceding period $\tau_2$ is selected to be 0 to 10H.

Figure 3:
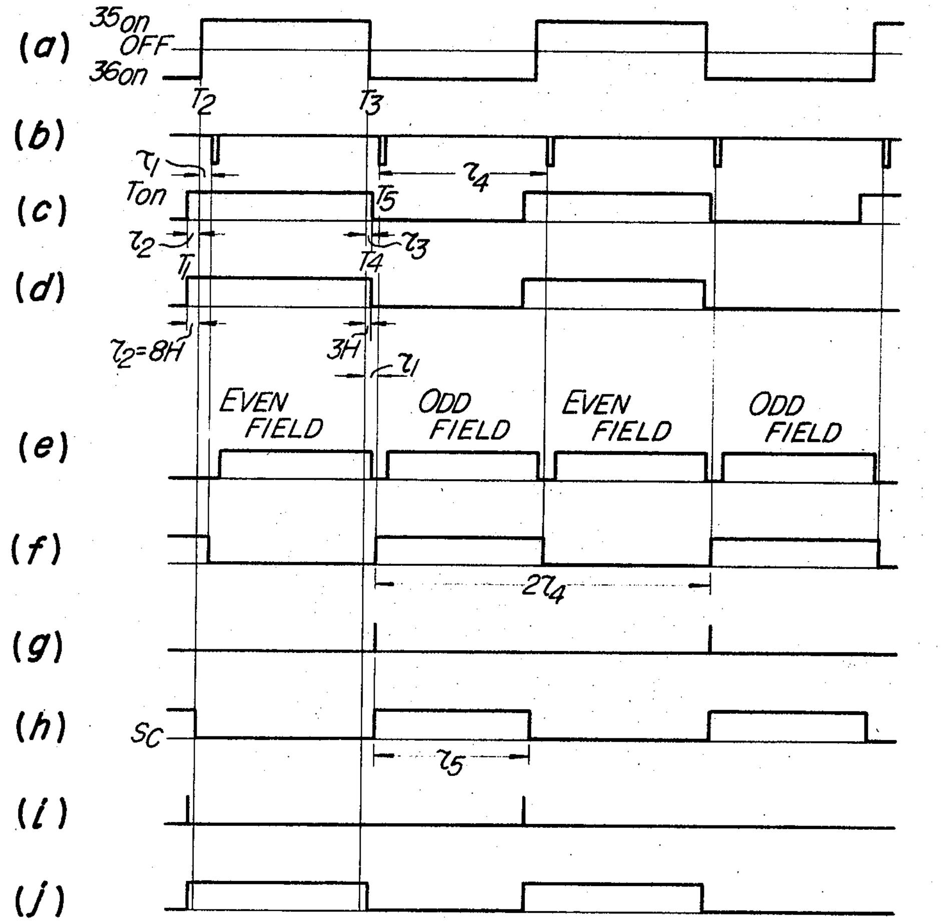
FIG. 3 is a view showing waveforms useful for explaining the operation of the present invention.

The terminating point $T_4$ of the conducting period $T_{on}$ is set within the period of time $\tau_1$ after the point of time $T_3$ when the connection of the head 35 to the brush is interrupted as shown in (*c*) or (*d*) of FIG. 3.

In the case where the number of horizontal synchronizing signals contained in one field of video signal is 525, 1H corresponds to $1H = 1/5.25$ percent. Thus, $10H = 1.9$ percent $3H = 0.6$ percent, and $12H = 2.3$ percent. From this, it will be seen that $T_{on} = 54.3$ percent is obtained where $T_1$ is earlier than $T_2$ by 10H and $T_4 = T_5$ which are later than $T_3$ by $12H$, and that $T_{on} = 50$ percent is obtained where $T_1 = T_2$ and $T_3 = T_4$.

Experimental results show that it is the most preferable to make $\tau_2 = 1.5$ percent, $\tau_3 = 0.5$ percent and $T_{on} = 52$ percent. In order to meet such conditions, $\tau_2 = 8H$ and $\tau_3 = 3H$ in the case where one frame contains 525 horizontal scanning lines, as shown in (*d*) of FIG. 3.

By determining the conducting period $T_{on}$ of the gate circuit as described above and supplying to the gate circuit a video signal in which odd and even field signals obtained by interlacing scanning are alternately arranged between the vertical synchronizing signals, the video signal is supplied to the brush 40 through the selector switch 41 in such a way that either the odd or even field signals (in this case, the odd field signals) are completely eliminated, that is, in the form of an intermittent video signal consisting of only the even field signals as shown in FIG. 3*f*. The even field signals are supplied only to the head 35, and no signal is imparted to the head 36.

The tape 30 is transported while being slantly wound more than half the rotational locus of the rotary head device, as well known in the art. Thus, the tape is recorded with the even field signals by means of the recording-reproducing head 35, and no recording is effected by the reproducing head 36.

The magnetic heads 35 and 36 are spaced apart from each other by about 180° and mounted on the support member 31 with a level difference *h* therebetween. In attempt to perform the reproducing operation, the level different *h* and the relationships of the head positions to the magnetic tracks formed on the tape are adjusted so that the heads are enabled to scan each of the magnetic tracks once respectively.

Thus, reproduction outputs corresponding to identical tracks are available from the heads. These outputs are switching-ly arranged in the form of time series by the slip ring 34 and then supplied to the reproducing amplifier 47 through the brush 40 and switch 41. Thus, there is no need to provide a mixer or switching circuit which has been required by the conventional apparatus, and only one reproducing amplifier is required, which leads to cost reduction and operational stabilization.

Figure 4:
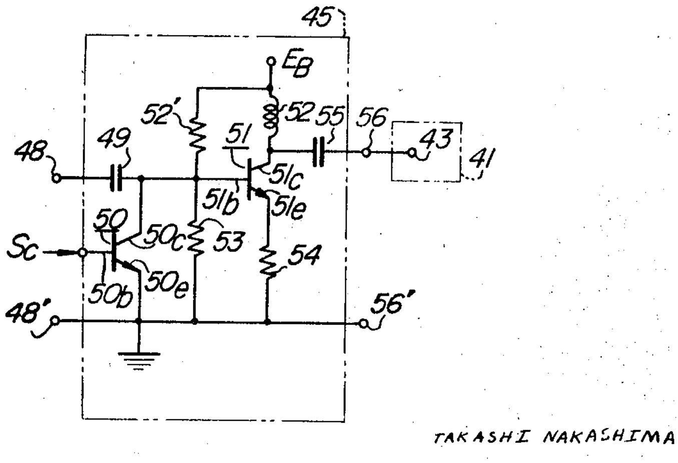

An example of gate circuit 45 is shown in FIG. 4.

In this Figure, numerals 48 and 48' represent signal input terminals 49 an input coupling capacitor, and 50 a gate transistor having the emitter **50*e* grounded and the collector 50*c* connected with the coupling capacitor. A gate opening and closing control signal $S_c$ is imparted to the base 50*b* of the gate transistor 50. Numeral 51 indicates an output transistor, to the collector 51*c* of which is applied a drive voltage from a power source $E_B$ through a load choke 52. The base 51*b* of the transistor 51 is connected with the connection point between the coupling capacitor 49 and the collector 50*c* of the transistor 50. A base bias is imparted to the base 51*b* with the aid of biasing resistors 52' and 53. The emitter 51*e* of the transistor 51 is grounded through a resistor 54**.

Numeral 55 represents an output coupling capacitor connected between an output terminal 56 and the collector **51*c* of the transistor 51. The output terminal 56 is coupled to the "recording" fixed contact 43 of the recording-reproducing operation selector switch 41**.

When a positive voltage is applied to the base **50*b* of the transistor 50, the latter is rendered conductive so that the base 51b of the transistor 51 is grounded whereby the transistor 51 is rendered nonconductive. On the other hand, when a negative voltage is imparted to the base of the transistor 50, the latter is rendered nonconductive so that an input signal to be recorded which is impressed to the input terminals 48 and 48' appears across the output terminals 56 and 56'** in the amplified form.

Figure 5:
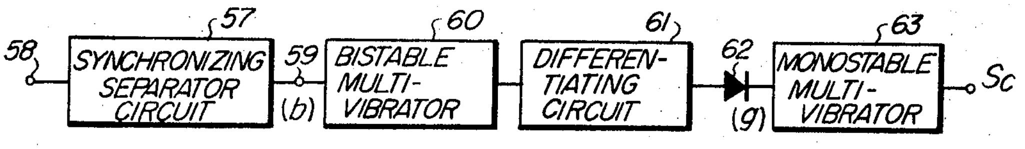
FIGS. 4 and 5 are circuit diagrams showing the main portions of one embodiment of the present invention, respectively.

Referring to FIG. 5, an example of circuit for generating a signal $S_c$ for controlling the opening and closing of the gate circuit.

In this Figure, numeral 57 represents a conventional synchronizing separator circuit having a terminal 58 to which a video signal to be recorded is supplied, the output of which is obtained at an output terminal 59 in the form of such a vertical synchronizing signal train as shown in (*b*) of FIG. 3.

Numeral 60 indicates a bistable multivibrator which is triggered by the aforementioned vertical synchronizing signal (*b*) so as to provide such a rectangular waveform as shown in (*f*) of FIG. 3 having a cyclic period $2\tau_4$ which is two times as long as the period $\tau_4$ of the vertical synchronizing signal. The rectangular waveform (*f*) is differentiated by a differentiating circuit 61 and then its half-wave is rectified by a rectifier 62 so as to be converted to such pulses as shown in (*g*) of FIG. 3 which occur at a cyclic period twice as long as that of the vertical synchronizing signal. The, the bistable multivibrator 63 is triggered by the pulse (*g*). In this case, the conducting period $\tau_5$ of this multivibrator is made shorter than the cyclic period $\tau_4$ of the vertical synchronizing signal by $\tau_1 + \tau_2$, i.e., $3H$ to $22H$, as shown in (*h*) of FIG. 3. The resulting positive rectangular waveform is used as signal $S_c$.

The rectifier 62 is connected in such a direction as to pass therethrough only the differentiated waveform of the vertical synchronizing signal which occurs at a point of time later by $3H$ to $12H$ than that when the reproducing head 36 is connected by the switching operation.

Thus, the conducting period $T_{on}$ of the gate transistor 50 constituting the gate circuit 45 can be determined by selecting the polarity of the transistor 50 so that the latter is rendered conductive during the output conducting period of the multivibrator 63.

The aforementioned FIG. 5 circuit is adapted to derive the signal $S_c$ from the vertical synchronizing signal. A modified form of such circuit is also possible wherein a magnet piece 64 is provided on the head support disc 31 shown in FIG. 2 at such a position as to constitute no hindrance with respect to the normal operation of the heads. Further, there is provided a magnetic detector head 65 adapted to provide a detection pulse by detecting the magnetic field produced by the magnet piece on the rotational locus 66 of the magnet piece at such a position that it faces the magnet piece at a point of time earlier by a time corresponding to 0 to 2 percent of one cyclic period of rotation of the rotary head device than the point of time $T_2$ when the arcuate segment $34_1$ of the ring 34 is brought into contact with the brush 40. Thus, detection pulses such as shown in (i) of FIG. 3 are obtained by which the monostable multivibrator (not shown) is triggered. By selecting the conducting period of this multivibrator to be about 50 to 54.3 percent of one cyclic period of rotation of the rotary head device, such an output as shown in (j) of FIG. 3 is provided which in turn is converted to a negative rectangular waveform signal which is used as $S_c$.

As described above, in accordance with the present invention, only two sets of slip rings and brushes which are formed of a a noble metal and a single reproducing amplifier are required. Therefore, it is possible not only to reduce the manufacturing cost but also to prevent noise which tends to occur in the case where plural reproducing amplifiers are operated in parallel with each other as in the conventional apparatus.

We claim:

1. A field skip mode video tape recorder which has a rotary head device including a rotary head holder, a recording-reproducing head and a reproducing head, said heads being mounted on the rotary holder at different levels and spaced apart from each other by about 180°, and means for transporting a magnetic tape slantly around about at least half the periphery of said rotary head device, wherein an improvement comprises:

a. head switching contact means adapted to alternately establish external connection with respect to said heads at a point of time that is earlier than the appearance of the vertical synchronizing signal of a video signal to be recorded by a period of time corresponding to from 0.5 to 2.5 percent of one cyclic period of rotation of said rotary head device;

b. a reproducing amplifier;

c. means for supplying said video signal to be recorded to said switching contact means for a predetermined period of time during the recording operation; and d. means for supplying to said reproducing amplifier the outputs of said heads through said switching contact means during the reproducing operation, wherein the point of time when the supply of said video signal is initiated is so made as to be earlier by a period of time corresponding to about 2 to 0 percent of one cyclic period of rotation of said rotary head device than the point of time when said recording-reproducing head is established the connection with said switching contact means, and the point of time when the signal supply is terminated is so selected to be within a period between the point of times when the connection of said recording-reproducing head with and switching contact means is interrupted and the point of time when a vertical synchronizing signal contained in the video signal occurs.

2. A field skip mode video tape recorder according to claim 1, wherein said predetermined period of time is so determined as to correspond to about 50 to 54.3 percent of one cyclic period of rotation of the rotary head device.

3. A field skip mode video tape recorder according to claim 2, wherein said predetermined period of time is so determined as to correspond to about 52 percent of one cyclic period of rotation of said rotary head device.

4. A field skip mode video tape recorder which has a rotary head device including a rotary head holder with a rotary shaft a recording-reproducing head and a reproducing head, said heads being mounted on the rotary holder at different levels and spaced apart from each other by about 180°, and means for transporting a magnetic tape slantly around about at least half the periphery of the rotary head device, wherein an improvement comprises:

a. two ring-like conductive regions provided on said rotary holder coaxially with respect to the rotating shaft of said holder, one of said conductive regions being divided into two arcuate segments and insulated from each other with an insulation distance between the opposing ends thereof;

b. two brushes adapted for sliding contact with said two ring-like conductive regions respectively;

c. a reproducing amplifier;

d. means for supplying a video signal to be recorded to said brushes for a predetermined period of time during the recording operation; and e. means for connecting the brushes to said reproducing amplifier during the reproducing operation, wherein each of said two heads has a coil, one end of each coil being connected in common to said ring-like conductive region and the other end of each coil being connected to the arcuate segments, respectively, so that the coils are alternately connected with said brushes at every half rotation of said rotary head device, wherein the point of time when the coils are switched is selected to be earlier by a period of time corresponding to about 0.5 to 2.5 percent of one cyclic period of rotation of said rotary head device than the point of time when a vertical synchronizing signal of the video signal to be recorded occurs, and wherein the point of time when the video signal is supplied to the brushes by said video signal supplying means is selected to be earlier by about 2 to 0 percent of one cyclic period of rotation of said rotary head device than the point of time when said recording-reproducing head is connected with said brushes, and the point of time when the video signal supply is terminated is selected to be within a period between the point of time when the connection of said recording-reproducing head with said brushes is interrupted and the point of time when a vertical synchronizing signal occurs.

5. A field skip mode video tape recorder according to claim 4, wherein said predetermined period of time is so determined as to correspond to about 50 to 54.3 percent of one cyclic period of rotation of said rotary head device.

6. A field skip mode video tape recorder according to claim 4, wherein said predetermined period of time is so determined as to correspond to about 52 percent of one cyclic period of rotation of said rotary head device.

7. A field skip mode video tape recorder according to claim 4, wherein said video signal supplying means (e) includes a. means for extracting from the video signal to be recorded only those ones of the vertical synchronizing signals contained therein which occur subsequent to the points of time when the reproducing head is connected with the brushes;

b. a monostable multivibrator which is triggered by the output signals of the extracting means so as to be rendered conductive for a period of time shorter than about 0.5 to 4.3 percent of one cyclic period of rotation of said rotary head device; and c. a gate circuit which is rendered conductive only during the conducting period of said monostable multivibrator.

8. A field skip mode video tape recorder according to claim 4, wherein said video signal supplying means (e) includes: a magnet piece fixed to said rotary holder, and a detector head for detecting the access of the magnet piece said magnet piece being adapted to provide a detection pulse into the detector head at every point of time that is later by about 0.5 to 2.5 percent of one cyclic period of rotation of said rotary head device than the point of time when said reproducing head is connected with the brushes.

9. A field skip mode video tape recorder for recording and reproducing a video signal including vertical synchronizing pulses, said tape recorder having a rotary head device which includes a recording-reproducing head and a reproducing head and a rotary head holder operatively rotated in synchronism with the vertical synchronizing pulses for mounting thereon said heads at different levels with substantially 180° in angular difference therebetween with respect to an axis of said rotary head holder, and means for transporting a magnetic tape slantly around about at least half of the periphery of said rotary head device, wherein the improvement comprises:

head switching contact means having an input-output terminal for operatively connecting said input-output terminal thereof to said heads alternately at a moment that is earlier by 0.5 to 2.5 percent of one cyclic period of rotation of said rotary head holder than a moment when the vertical synchronizing pulses of the video signal occurs;

a gate circuit having input and output terminals, said input terminal being supplied with the video signal to be recorded, and said gate circuit selectively transmitting the video signal supplied to the input terminal to the output terminal thereof for a limited period of time whose commencement is set to be on or slightly before every commencement of the connection between said recording-reproducing head and said input-output terminal of said head switching contact means and whose end is set to be slightly after every termination of the connection between the recording-reproducing head and the input-output terminal;

a signal reproducing amplifier having input and output terminals for amplifying a signal supplied to the input terminal thereof; and a function selector switch for selectively connecting the input-output terminal of said head switching contact means to the output terminal of said gate circuit when said tape recorder is in a recording operation and to the input terminal of said signal reproducing amplifier when said tape recorder is in a reproducing operation;

whereby said gate circuit supplies the video signal to be recorded to the input-output terminal of said head switching contact means for a period of time not shorter than 50 percent of one cyclic period of rotation of said rotary head holder when said tape recorder is in the recording operation whereas a video signal reproduced by each of said heads is time sequentially supplied alternately to the input terminal of said signal reproducing amplifier for a period of time which is 50 percent of one cyclic period of the rotation of said rotary head holder when said tape recorder is in the reproducing operation.

10. The improvement in a field skip mode video tape recorder according to claim 9, wherein the moment when the transmission of the video signal from the input terminal to the output terminal of said gate circuit is initiated is so set as to be about 2 to 0 percent of one cyclic period of rotation of said rotary head holder as early as a moment when the connection between said recording-reproducing head and the input-output terminal of said head switching contact means commences, the moment when said video signal transmission is terminated is so set as to be within a period between a moment when the connection between said recording-reproducing head and the input-output terminal is released and a moment when a vertical synchronizing pulse occurs subsequently after the release of the connection between said recording-reproducing head and the input-output terminal.

13. The improvement in a field skip mode video tape recorder according to claim 9, wherein said gate circuit operatively transmits the video signal to be recorded from the input to the output terminals thereof for a period of time of about 50 to 54.3 percent of one cyclic period of rotation of said rotary head holder.

14. The improvement in a field skip mode video tape recorder according to claim 13, wherein said gate circuit operatively transmits the video signal to be recorded from the input to the output terminals thereof for a period of time of about 52 percent of one cyclic period of rotation of said rotary head holder.

15. The improvement in a field skip mode video tape recorder according to claim 9, wherein said head switching contact means comprises:

two-ring shaped conductive regions provided coaxially with respect to each other and rotated in synchronism with said rotary head holder, one of said conductive regions being divided into two arcuate segments and insulated from each other with an insulation distance between each pair of opposing ends thereof; and two brushes adapted to slidably contact with said two ring-shaped conductive regions, respectively;

said input-output terminals being provided on said brushes said recording-reproducing head being connected between one of the two arcuate segments of said one conductive region and the other one of said conductive regions, and said reproducing head being connected between the other one of the two arcuate segments and said the other one of the conductive regions.

11. The improvement in a field skip mode video tape recorder according to claim 9, which further comprises:

means for generating control pulses representative of only those ones of the vertical synchronizing pulses which occur subsequent to the moment when said reproducing head is connected with the input-output terminal of said head switching contact means; and a monostable multivibrator which is triggered by said control pulses so as to be rendered conductive for a period of time shorter than about 0.5 to 4.3 percent of one cyclic period of rotation of said rotary head holder;

said gate circuit being rendered conductive only during the conductive period of said monostable multivibrator.

12. The improvement in a field skip mode video tape recorder according to claim 9, which further comprises:

a magnet piece fixed to said rotary holder; and a detector disposed to be magnetically coupled with said magnetic piece intermittently during rotation of said rotary head holder for detecting the access of said magnet piece thereto and for generating a detection pulse in response to detection of the access, said magnet piece and said detector being so disposed that the generation of the detection pulse is later by about 0.5 to 2.5 percent of one cyclic period of rotation of said rotary head holder than the connection between said reproducing head and the input-output terminal of said head switching contact means has been completed.

16. The improvement in a field skip mode video tape recorder according to claim 15, which further comprises:

means for generating control pulses representative of only those ones of the vertical synchronizing pulses which occur subsequent to the moment when said reproducing head is connected with the input-output terminal of said head switching contact means; and a monostable multivibrator which is triggered by said control pulses so as to be rendered conductive for a period of time shorter than about 0.5 to 4.3 percent of one cyclic period of rotation of said rotary head holder;

said gate circuit being rendered conductive only during the conductive period of said monostable multivibrator

17. The improvement in a field skip mode video tape recorder according to claim 16, which further comprises:

a magnet piece fixed to said rotary head holder; and a detector disposed to be magnetically coupled with said magnetic piece intermittently during rotation of said rotary head holder for detecting the access of said magnet piece thereto and for generating a detection pulse in response to detection of the access, said magnet piece and said detector being so disposed that the generation of the detection pulse is later by about 0.5 to 2.5 percent of one cyclic period of rotation of said rotary head holder than the connection between said reproducing head and the input-output terminal of said head switching contact means has been completed.

* * * * *